Dec. 26, 1967  F. E. BUSCHBOM  3,360,140
FORAGE DISTRIBUTOR

Filed Oct. 22, 1965  10 Sheets-Sheet 1

INVENTOR.
FLOYD E. BUSCHBOM
BY Braddock & Burd
ATTORNEYS

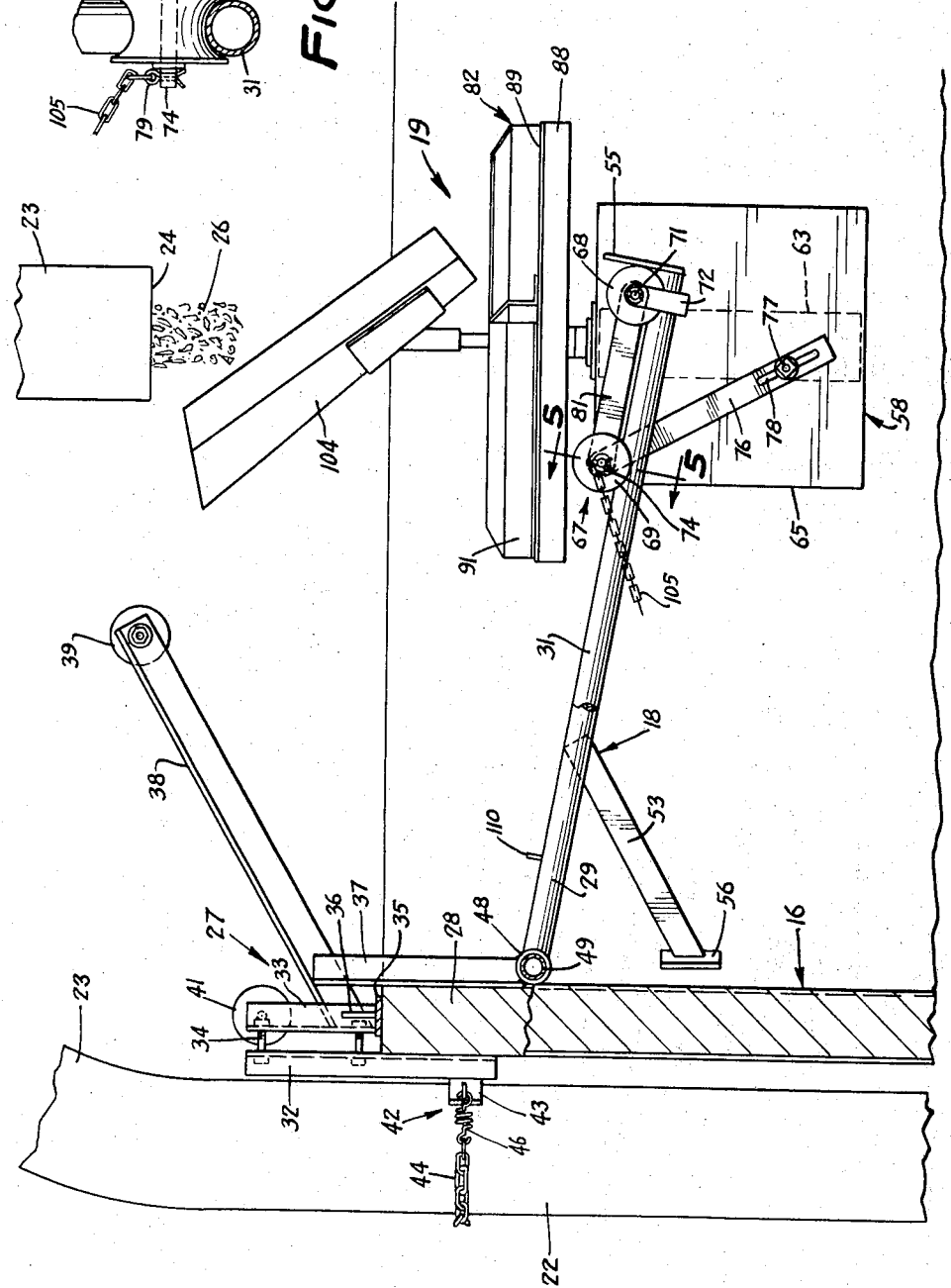

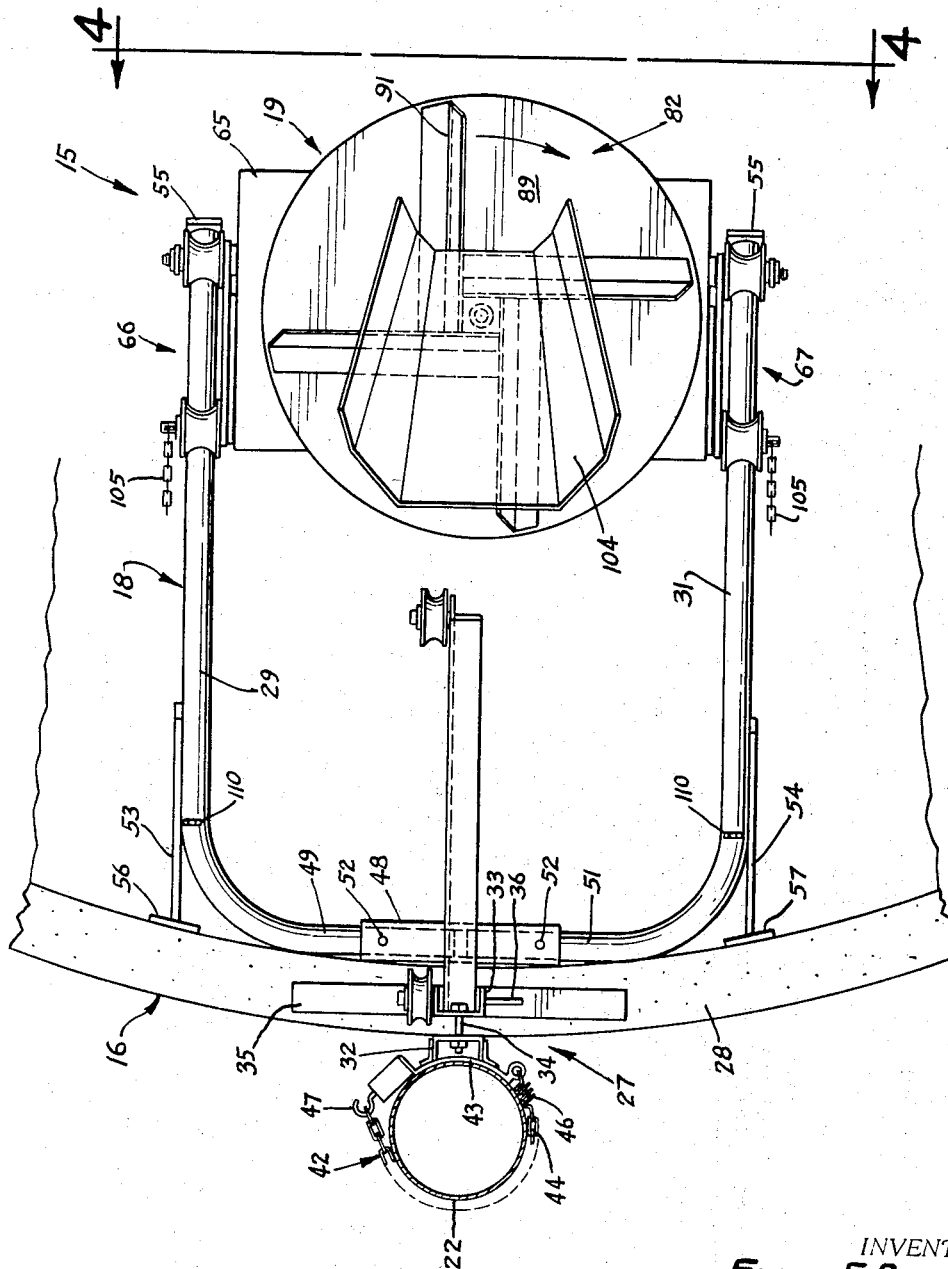

Dec. 26, 1967　　　　F. E. BUSCHBOM　　　　3,360,140
FORAGE DISTRIBUTOR
Filed Oct. 22, 1965　　　　　　　　　　　　10 Sheets-Sheet 4
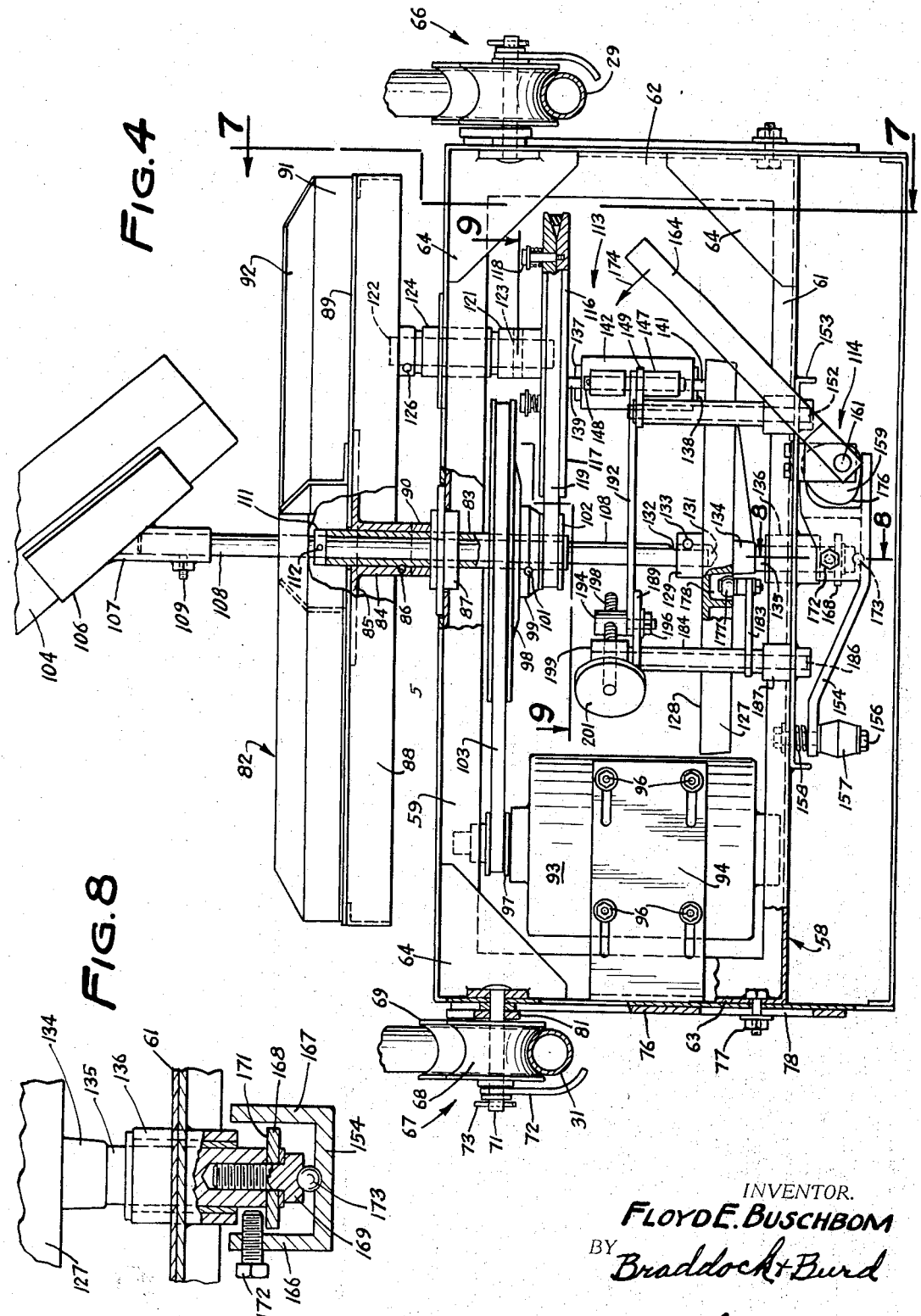
INVENTOR.
FLOYD E. BUSCHBOM
BY Braddock+Burd
ATTORNEYS INVENTOR.
FLOYD E. BUSCHBOM
BY Braddock+Burd
ATTORNEYS Dec. 26, 1967  F. E. BUSCHBOM  3,360,140
FORAGE DISTRIBUTOR
Filed Oct. 22, 1965  10 Sheets-Sheet 6

INVENTOR.
FLOYD E. BUSCHBOM
BY Braddock+Burd
ATTORNEYS

Dec. 26, 1967  F. E. BUSCHBOM  3,360,140
FORAGE DISTRIBUTOR
Filed Oct. 22, 1965  10 Sheets-Sheet 7

INVENTOR.
FLOYD E. BUSCHBOM
BY
Braddock+Burd
ATTORNEYS

Dec. 26, 1967  F. E. BUSCHBOM  3,360,140
FORAGE DISTRIBUTOR
Filed Oct. 22, 1965  10 Sheets-Sheet 8

INVENTOR.
FLOYD E. BUSCHBOM
BY
Braddock+Burd
ATTORNEYS

Dec. 26, 1967  F. E. BUSCHBOM  3,360,140
FORAGE DISTRIBUTOR
Filed Oct. 22, 1965  10 Sheets-Sheet 9

INVENTOR.
FLOYD E. BUSCHBOM
BY
Braddock+Burd
ATTORNEYS

Dec. 26, 1967  F. E. BUSCHBOM  3,360,140
FORAGE DISTRIBUTOR
Filed Oct. 22, 1965  10 Sheets-Sheet 10

INVENTOR.
FLOYD E. BUSCHBOM
BY
Braddock & Burd
ATTORNEYS

United States Patent Office 3,360,140
Patented Dec. 26, 1967

3,360,140
FORAGE DISTRIBUTOR
Floyd E. Buschbom, Long Lake, Minn., assignor to Vandale Corporation, Wayzata, Minn., a corporation of Minnesota
Filed Oct. 22, 1965, Ser. No. 500,927
24 Claims. (Cl. 214—17)

ABSTRACT OF THE DISCLOSURE

A distributor mounted on the top of a silo for evenly spreading forage material discharged into the silo. A frame having a pair of arms directed toward the center of the silo supports the distributor under a discharge fill pipe. The distributor has a rotatable inclined chute which directs the material in a circular path onto the top of a flat rotating slinger disc. Both the inclined chute and slinger disc are rotated by an electric motor coupled by a direct drive to separate drive shafts for the inclined chute and the slinger disc. The direct drive is a variable drive mechanism operable to sequentially increase and decrease the speed of rotation of the inclined chute during each revolution so that uneven amounts of forage material are directed in a circular path onto the rotating slinger disc. One form of the drive includes a pair of engaging rollers positioned between spaced driven and drive plates. A guide mechanism moves the rollers radially with respect to the axis of the plates to change the speed of rotation of the inclined chute. Another form of the drive to vary the speed of rotation in the inclined chute is a pair of gears with the driven gear having a radial slot to receive the drive shaft of the inclined plate and to adjust the rate of increase and decrease of the speed of rotation of the inclined chute.

---

This invention relates to an apparatus and method for distributing material in a storage area. More particularly, the invention is characterized as an apparatus and method for evenly spreading forage material, as ensilage and haylage, in a silo during the discharge of the forage material into the silo.

In the filling operation of a tower silo, forage material such as chopped corn or grasses, is dumped into a conveyor which transports and discharges the forage material into the silo. The conveyor may be a blower having an upright pipe terminating in a curved discharged end projected over the top of the silo wall into the top interior of the silo. The blower operates to continuously transport forage material up the blower pipe and discharge forage material as a continuous stream into the top of the silo. This forage material falls into the interior of the silo forming an inverted conical shaped pile. During the fall of the forage material the heavy particle separate from the light particles with the lightweight particles settling around the base of the pile and adjacent the silo wall. This uneven distribution of forage material in the silo results in air pockets in the lightweight forage material adjacent the silo wall. This entrapped air is a primary factor in the spoilage of the forage material in the area of the air pockets.

To minimize the size of the piles in the silo and to provide for even distribution of the forage material in the silo, tubular members are normally attached to the discharge end of the silo blower pipe to deflect the forage material to a selected location in the silo. In order to change the discharge direction of the forage material discharged into the silo the angle of the tubular member with respect to the end of the blower pipe must be adjusted. This requires frequent climbing to the top of the silo.

In order to obtain a completely even distribution of the forage material in the silo and to provide a tramping action, a series of tubular members can be connected end-to-end with links to form an elongated flexible tubular trunk extended downwardly into the interior of the silo. The top tubular member is connected to the discharge end of the silo blower pipe so that the forage material is discharged into the flexible tubular trunk. When this structure is used a man must be placed inside the silo to move the elongated flexible trunk around during the discharge of the forage material into the silo. As the level of the silage raises the bottom tubular member is disconnected and lowered down the silage chute. This operation requires an extra man as well as considerable effort.

It has been proposed to use rotating scraper arms of a silo unloading machine to level the top surface of the forage material during the filling of the silo. The patent to Cordis No. 2,445,056 describes a silo unloader usable to level the top surface of silage during the filling of the silo to avoid the inclusion of air pockets. This structure requires winch means to elevate the silo unloader during the filling of the silo as well as frequent attention to avoid covering the machine with forage material.

It is the object of this invention to provide an improved distributor unit for automatically and evenly spreading forage material discharged into the silo from a silo blower pipe.

Another object of the invention is to provide an improved method for evenly distributing forage material in a tower silo.

A further object of the invention is to provide a forage distributor unit which is adjustably mounted on the top of a tower silo so as to be usable with blower pipes having curved discharged ends or chutes of varying diameters.

A further object of the invention is to provide a forage material distributor unit which is tiltable about a horizontal axis so as to be usable with silos having varying diameters to evenly distribute forage material over the entire area of the interior of the silo.

Yet another object of the invention is to provide a forage material distributor unit with a deflector member operable to rotate at a variable rate of speed to direct forage material in a varying rate in a circular path to provide for the even distribution of forage material over the entire inside area of the silo.

Another object of the invention is to provide a frame unit for supporting a forage material distributor unit on the top of a tower silo.

Another object of the invention is to provide a combined clutch and brake for controlling the position of a rotatable element.

A further object of the invention is to provide a variable speed drive for a rotatable element.

Yet another object of the invention is to provide a clutch in combination with a variable speed drive for a rotatable element.

An additional object of the invention is to provide a forage distributor assembly having a distributor unit and a frame unit capable of being readily installed in a practical manner on the top of a tower silo and which is sturdy in construction, economical in cost, and reliable in use.

Further objects and advantages of this invention will be readily apparent from the consideration of the following specification relating to the annexed drawings.

To the accomplishment of the foregoing and related ends, this invention comprises the features hereinafter fully described and particularly pointed out in the claims. The following description sets forth in detail an illustrative embodiment of the invention, being indicative, however, of one of the various ways in which the principles of the invention may be employed.

The invention is illustrated by the drawings in which the same numerals refer to corresponding parts and in which:

FIGURE 2 is an enlarged sectional view taken along the line 2—2 of FIGURE 1;

FIGURE 3 is an enlarged plan view of the ensilage distributor assembly of FIGURE 1;

FIGURE 4 is an enlarged sectional view taken along the line 4—4 if FIGURE 3 with parts shown in section;

FIGURE 5 is an enlarged sectional view taken along the line 5—5 of FIGURE 2;

FIGURE 8 is an enlarged sectional view taken along the line 8—8 of FIGURE 4;

Figure 1:
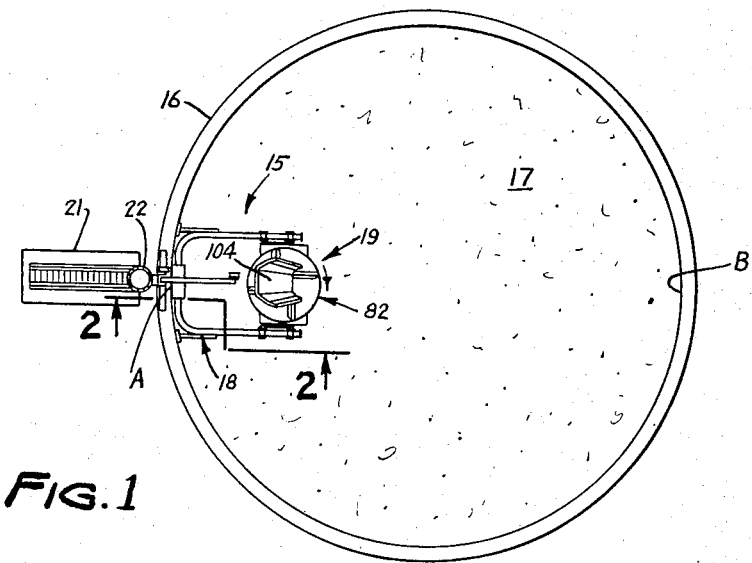
FIGURE 1 is a plan view of the ensilage distributor assembly of the invention mounted on the side wall of a tower silo.

Referring to the drawings there is shown in FIGURE 1 the distributor assembly 15 of this invention mounted on a tower silo 16 used to store forage material 17 such as ensilage and haylage. The distributor assembly 15 has a frame unit 18 secured to the top of the silo side wall, and projected into the top of the silo storage area. A distributor unit 19 is adjustably mounted on the frame unit 18.

In the handling of chopped forage material a conveyor 21, such as a blower or silo filler, is used to transport forage material from the base of the silo into the inside of the silo. The conveyor 21 has an upright pipe 22 connected to a curved discharge chute 23. As shown in FIGURE 2, the discharge chute 23 has a downwardly open discharge end 24 for directing cut forage material 26 onto the distributor unit 19. In use, the distributor unit 19 functions to spread out the forage material as it is discharged into the silo in substantially equal apportionment over the entire area of the inside of the silo 16.

As shown in FIGURE 1, the frame unit 18 supports the distributor unit 19 in an off center position with respect to the center of the silo. This location of the distributor unit 19 does not interfere with a cable suspended silo unloading machine elevated to the top of the silo such as a silo unloading apparatus illustrated in the patent to McCann et al. No. 2,995,260. The distributor unit 19 is laterally spaced from and positioned slightly below the raised silo unloader and thus spreads the forage material during the filling of the silo without interference from the silo unloader.

As shown in FIGURES 2 and 3, the frame unit 18 comprises a clamp assembly 27 positioned in gripping engagement with a top portion 28 of the wall of the silo 16. A pair of substantially parallel rails 29 and 31 attached to the clamp assembly 27 project radially into the silo. As shown in FIGURE 2, the rails 29 and 31 project downwardly into the silo at an agle of about 10° with respect to the horizontal plane of the top edge of the silo.

The clamp assembly 27 as shown in FIGURES 2 and 3 comprises a pair of upright channel members 32 and 33 adjustably attached together with a pair of nut and bolt assemblies 34. The channel member 32 extends below the top of the silo wall and is in engagement with the outside surface thereof. A horizontal plate 35 rests on the top of the silo wall and is secured to the bottom end of the upright channel member 33. A gusset 36 is secured to the upright channel member 33 and the top of plate 35 to reinforce the connection between these members. The plate 35 has a flat bottom side in surface engagement with the top edge of the silo wall and thus provides the clamp assembly with lateral stability. An upright angle member 37 positioned adjacent the inside wall of the silo is secured at its upper end to an upwardly and inwardly projected arm 38. The lower or outer end of the arm 38 is secured to the channel member 33 adjacent the plate 35. In placing the clamp assembly 27 on the silo wall the nut and bolt assemblies 34 are adjusted to move the channel member 32 and the upright angle member 33 toward each other to firmly grip the outer and inner surfaces of the silo wall 28.

To aid in the assembly of the frame unit 18 and the distributor unit 19 on the silo wall a first pulley 39 is rotatably mounted on the upper end of the arm 38 and a second pulley 41 is rotatably mounted on the upper end of the channel member 33. In use, a rope or similar flexible member is trained over the pulleys 39 and 41. This provides the rancher with a convenient rope and pulley arrangement usable to elevate the rails 29 and 31 as well as the distributor unit 19 to the top of the silo.

As shown in FIGURE 3, the upright channel member 33 has outwardly directed flanges attached to a holding unit indicated generally at 42 for the upright pipe 22. The holding unit includes an arcuate back member 43 secured to the channel member 33 and positioned partly around the pipe 22. A link chain 44 is attached at one end by a spring 46 to the arcuate back member 43. The opposite end of the chain is coupled to a hook 47 connected to the other end of the arcuate back member 43. The chain 44 is wrapped around the pipe 22 and engages with the hook 47 to hold the pipe 22 in firm engagement with the arcuate back member 43. The clamp 27 thus includes a holding unit 42 for conveniently and effectively positioning the upper end of the pipe 22 adjacent the silo wall.

As shown in FIGURES 2 and 3, the rails 29 and 31 are coupled to the clamp assembly 27 with a transversely disposed tubular member 48 secured to the bottom end of the upright angular member 37. The rails 29 and 31 are tubular members having bent arms 49 and 51 respectively telescoped into the opposite ends of the tubular member 48. Set screws 52 hold the arms 49 and 51 in assembled relation with the tubular member 48. Downwardly and outwardly projected legs 53 and 54 are secured to the rails 29 and 31 radially inwardly from the curved arms 49 and 51. Upright flat shoes 56 and 57 secured to the lower ends of the legs 53 and 54 bear against the inside wall of the silo 16 and limit the downwardly pivotal movement of the rails 29 and 31. Upright stop members 55 are secured to the outer ends of the rails 29 and 31.

As shown in FIGURES 3 and 4, the distributor unit 19 is positioned between and supported on the rails 29 and 31. Stop members 55 prevent the distributor unit 19 from moving longitudinally of the outer ends of the rails 29 and 31. The distributor unit 19 has a frame indicated generally at 58 comprising vertically spaced and parallel extended top and bottom channel members 59 and 61 connected at their opposite ends to upright side channel members 62 and 63. Gusset plates 64 reinforce the joining corners of the channel members.

The entire frame 58 is enclosed within a box shaped housing 65. The frame 58 is rotatably attached to wheel assemblies 66 and 67 disposed on opposite sides of the frame 58 which movably support the distributor unit 19 on the rails 29 and 31.

The wheel assemblies 67 and 66 are adjustably mounted on the opposite side channel members 62 and 63 respectively. The following detailed description is limited to wheel assembly 67 as it is identical to wheel assembly 66. As shown in FIGURES 2 and 4 the wheel assembly 67 has a pair of wheels 68 and 69 having hyperbolic peripheral surfaces which ride on the top portion of the rail 31. The wheel 68 is rotatably mounted on an axle 71 secured to and projected laterally from the top end of the upright side channel member 63. A guide 72 is mounted on the outer end of the axle 71 and extends downwardly and curves inwardly under the rail 31 and functions as a stop to prevent the wheel 68 from accidentally leaving the rail 31. A retainer 73, such as a cotter pin, maintains the wheel 68 and the guide 72 in assembled relation on the axle 71.

Referring to FIGURE 5, the wheel 69 is rotatably mounted on an axle 74 secured at its inner end to a strut 76. The lower end of the strut 76, shown in FIGURE 4, is adjustably attached to the frame 58 by a nut and bolt assembly 77 extended through a longitudinal slot 78 in the lower end of the strut 76. The wheel 69 is maintained in assembled relation on the axle 74 by a retainer 79, such as a cotter key, diametrically projected through the end of the axle 74. As seen in FIGURE 2, a bar 81 connected to the axles 71 and 74 maintains the lateral space between the wheels 68 and 69.

The frame 58 is pivotally mounted for rotation about the axis of the axle 71. This permits the angular position of the frame 58 to be adjusted by changing the relative location of the nut and bolt assembly 77 with respect to the end of the strut 76. The purpose of this adjustment will be discussed hereinafter.

The forage material 26 discharged from the chute 23 is distributed in the silo by a spreader or slinger indicated generally at 82 positioned above the frame 58. As shown in FIGURE 4, the slinger 82 is mounted on an upright tubular shaft 83 by a coupling 84 having a flat horizontal top flange 85. The coupling 84 is drivably connected to the upright tubular shaft by a drive pin or screw 86. The upright shaft 83 is rotatably mounted for rotation about a vertical axis in a bearing 87 secured to the center section of the top channel member 59.

The slinger 82 comprises an inverted circular pan 88 secured to the top flange 85. The pan has a flat top surface 89 to which is secured four equally spaced upright vanes 91. Each vane has a forwardly and upwardly projected lip 92. The upright vanes 91 together with the lips 92 form with the flat top surface 89 pie-shaped pockets for accumulation forage material and limiting the circumferential movement of the forage material relative to the top surface 89 of the pan 88 when the slinger is rotated.

The slinger 82 is rotated in a direction of the arrow as shown in FIGURE 3 by an electric motor 93 located between the top and bottom channel members 59 and 61 of the frame 58. The motor 93 is adjustably mounted on a bracket 94 by nut and bolt assemblies 96. The bracket 94 is secured to the upright side channel member 63. The nut and bolt assemblies 96 project through elongated horizontal slots in the bracket 94 to adjustably mount the motor 93 on the bracket. Power is transmitted from the motor 93 to the tubular shaft 83 by a belt and pulley drive including a drive pulley 97 mounted on the motor drive shaft in alignment with a driven pulley 98 having a hub 99 drivably secured to the tubular shaft 83 by a pin or screw 101. The hub 99 is integral with a small pulley 102 the purpose of which will be described hereinafter. A flexible belt 103, such as a V-belt, is trained over pulleys 97 and 98 so that on energization of the motor 93 power is transmitted through the belt 103 to the pulley 98 which in turn drives the tubular shaft 83 thereby rotating the slinger 82.

As shown in FIGURES 2, 3 and 4, a chute or trough-like deflector member 104 is positioned above the slinger 82. The chute 104 is positioned at an upward angle of about 45° with respect to the plane of the top surface 89 of the slinger 82. As shown in FIGURE 3, the chute 104 has a generally transverse U-shaped cross-section gradually decreasing to the discharge or lower end located adjacent the center of the slinger 82. The chute 104 functions as a collector of the material 26 discharged from the pipe discharge chute 23 and directs the forage material 26 onto the rotating slinger 82 which throws the forage material 26 outwardly in a substantially even pattern into the silo.

The entire distributor 19 is adjustably positioned on the rails 29 and 31 so that the discharged forage material 26 is collected by the U-shaped chute 104. To accommodate different curved discharge end sections of blower pipes the distributor unit 19 is moved along the rails 29 and 31 and retained in selected positions by chains 105 which are adjustably attachable to upright U-shaped fingers 110 secured to the top of the upper end sections of the rails 29 and 31. Chains 105 are attached to the retainers 79 of the wheel assemblies 66 and 67.

Referring to FIGURE 4, the chute 104 is supported on a generally U-shaped holder 106 having a downwardly projected tubular neck 107. An upright shaft 108 is telescoped into the tubular neck 107 and secured thereto by a set screw 109. The shaft 108 extends axially through the upright tubular shaft 83. A collar 111 surrounds the shaft 108 and is secured thereto by a set screw 112. The collar abuts against the top of the tubular shaft 83 and functions as a stop to limit the downward movement of the shaft 108 thereby supporting the chute 104 above the slinger 82.

The chute 104 rotates about the vertical axis of the shaft 108 to direct forage material in a circular path onto the slinger 82 to provide for the even distribution of forage material deposited in the silo. A drive mechanism indicated generally at 113 functions to rotate the shaft 108. Included in the drive mechanism 113 is a combined clutch and brake indicated generally at 114 which is operative to fix the angular location of the chute 104 so that the forage material may be directed in a specific direction onto the slinger 82.

Figure 7:
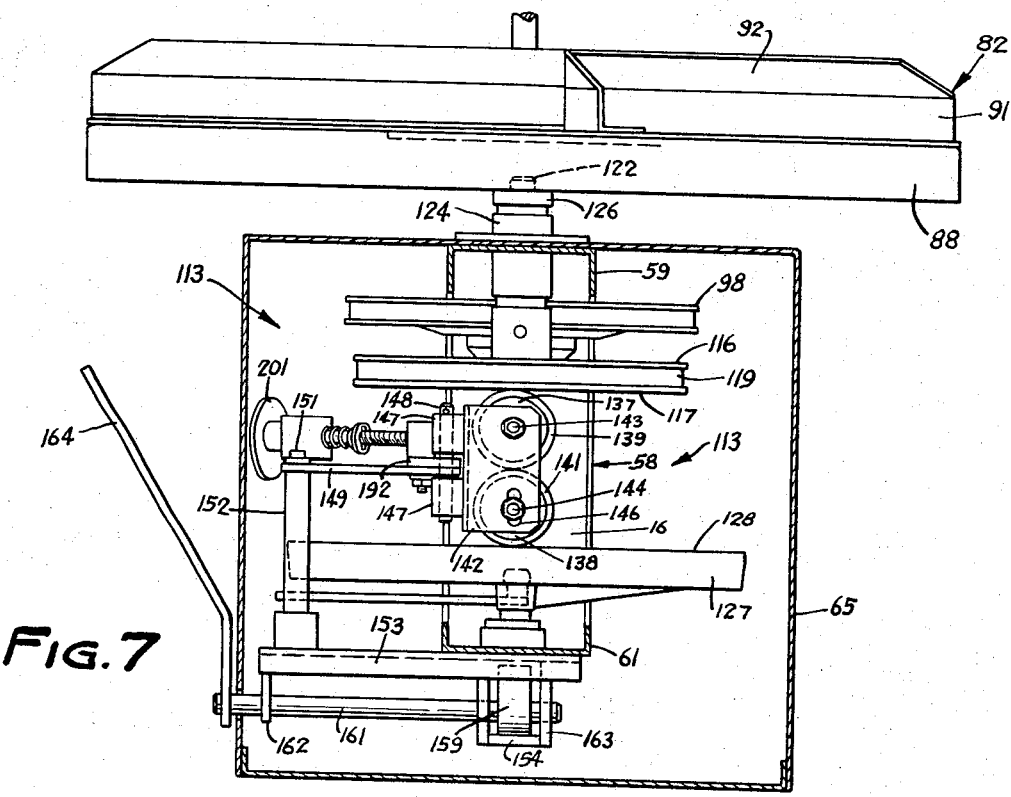
FIGURE 7 is an enlarged sectional view taken along the line 7—7 of FIGURE 4.

Referring to FIGURES 4 and 7, the drive mechanism 113 comprises a split plate pulley 116 having a flat smooth bottom face 117. Spring and bolt units 118 align and bias the plates of the pulley 116 toward each other and into gripping engagement with a belt 119, such as a V-belt, trained over the pulleys 102 and 116. The top plate of the pulley 116 has an upright boss 121 having an axial bore accommodating an upright shaft 122. The transverse pin 123 drivably couples the boss 121 with the shaft 122 projected through a bearing 124 mounted on the top frame member 59. A collar 126 is secured to the upper end of the shaft 122 to maintain the shaft in assembled relation with respect to the bearing 124 and to maintain the alignment of the pulley 116 with the pulley 102.

A horizontal plate 127 having a flat top face 128 is positioned below the split pulley 116. The plate 127 is circular in shape and has a peripheral edge in substantial axial alignment with the axis of rotation of the pulley 116. A boss 129 having an axial bore 131 is integral with the center of the plate and projects upwardly from the flat surface 128. The lower end of the shaft 108 projects into the bore 131 and is drivably connected therewith by a ball and groove coupling. The lower end of the shaft 108 has an axial groove 132 accommodating a ball 133 recessed in the side wall of the boss 129 forming the bore 131. This coupling provides a positive drive between the plate 127 and the shaft 108 and permits the plate 127 to be raised and lowered without releasing the drive between the plate 127 and shaft 108. The plate 127 has a downwardly projected center boss 134 carrying a shaft 135 projected through a sleeve bearing 136 mounted on the bottom channel member 61. The boss 134 is spaced above the bearing 136 so as to permit limited vertical movement of the plate 127.

As shown in FIGURE 7, power is transmitted from the pulley 116 to the plate 127 by a pair of rollers 137 and 138 having peripheral beads 139 and 141 respectively and in driving engagement with each other and in driving engagement with the flat face 117 of the pulley 116 and the flat face 128 of the plate 127. The rollers 137 and 138 are hard plastic members which have good friction characteristics along with minimum wear features. The rollers 137 and 138 are maintained in vertical alignment by an upright U-shaped member 142 carrying an axle 143 for the roller 147 and an axle 144 for the roller 138. The axle 144 projects through an upright slot 146 in the U-shaped member 142 to enable the position of the roller 138 to be adjusted relative to the roller 137. Horizontally projected from the base of the U-shaped member 142 are a pair of vertically spaced ears 147 carrying an upright pin 148 which projects through a link 149 positioned between the ears 147. A bolt 151 pivotally mounts the opposite end of the link 149 to the top of a tubular support 152 secured to an inverted channel support member 153. As shown in FIGURES 4 and 7 channel member 153 is secured to the bottom of the frame channel member 61 and projects laterally therefrom.

On energization of the motor 93 the pulley 102 drives the belt 119 rotating the pulley 116 about the axis of the shaft 122. With the peripheral beads 139 and 141 disposed in driving contact with the pulley face 117 and the plate face 128 respectively and in driving contact with each other rotation of the pulley 116 rotates the rollers 137 and 138 about their respective axes which in turn rotates the plate 127. The ball 133 drivingly couples the plate boss 129 to the shaft 108 so that on rotation of the plate 127 the shaft 108 is rotated with the result that the chute 104 turns about an upright axis discharging forage material in a circular path onto the slinger 82.

The rollers 137 and 138 are maintained in driving engagement with the pulley face 117 and the plate face 128 by the clutch and brake 114 actuator structure comprising an off-set lever 154 pivotally mounted to the bottom of the channel member 153 by an upright nut and bolt assembly 156. The bolt of the nut and bolt assembly 156 projects through an enlarged hole in the end of the lever 154 so as to permit angular movement of the lever. A resilient compressible member 157, such as a large barrel-shaped rubber cylinder, biases the lever 154 in an upright direction into engagement with a coil spring 158 positioned between the top of the lever 154 and the channel member 153.

The opposite end of the lever 154 is bifurcated and rotates on a cam 159 secured to a transverse shaft 161. As shown in FIGURE 7, the shaft 161 is rotatably mounted on brackets 162 and 163 projected downwardly from and secured to the channel member 153. Secured to the outer end of the shaft 161 is a control arm 164 which in use is arcuately moved to rotate the cam and thereby release the clutch and actuate the brake or in the alternative release the brake and actuate the clutch.

The connection between the control lever 154 and the support shaft 135, shown in FIGURE 8, comprises upright flanges 166 and 167 disposed on opposite sides of the lower end of the shaft 135. A brake disc 168 is secured to the bottom of the shaft 135 by a bolt 169 axially threaded into the shaft 135. The brake disc 168 has a diameter which is larger than the diameter of the shaft 135 and provides a braking surface 171 adapted to engage a set screw 172 threaded through flange 166. The forward end of the set screw 172 is spaced from the shaft 135 to permit free rotation of the shaft 135 when the brake is released. A lift ball 173 is interposed between the head of the bolt 169 and the lever 154 so that when the lever 154 is biased in an upward direction by the resilient member 157 the plate 127 functions as a clutch pressure plate as it is biased upwardly into driving engagement with the peripheral bead 141 on the roller 138.

This driving engagement is broken on angular movement of the arm 164 in the direction of the arrow 174 as shown in FIGURE 4. The arm 164 is moved approximately 90° so that the peripheral section 176 of the cam 159 engages the lever 154 moving the lever 154 in a downward direction. This movement of the lever 154 carries the inner end of the set screw 172 into frictional engagement with the braking surface 171 of the disc 168. The set screw 172 carries the shaft 135 and plate 127 in a downward direction thereby terminating the drive engagement between the plate face 128 and the peripheral bead 141 of the roller 138. The friction contact of the screw 172 on the disc 168 prevents the plate 127 from turning thereby holding the chute 104 in a fixed position.

When the chute 104 is held in a selected angular location forage material is directed in a specific direction onto the slinger 82. This permits the rancher to vary the distribution of forage material discharged into the silo.

The brake is released on movement of the arm 164 in the opposite direction of the arrow 174 so as to raise the lever 154. The top bifurcated section of the control lever 154 rides on the top section of the cam 159 so that the lever 154 pivots on the cam 159. The resilient cylindrical member 157 provides an upwardly directed biasing force on the lever 154 which is transmitted through the lift ball 173 to the plate shaft 135 and thereby moving the plate 127 upwardly from the release position to the engaged position. The drive connection between the boss 129 and the end of the shaft 108 does not interfere with the limited vertical movement of the plate 127 as the ball 133 rides in the groove 132.

As shown in FIGURE 1, the distributor unit 19 is positioned adjacent the portion of the silo wall carrying the frame unit 18 so that the radial distance between the slinger 82 and the silo wall increases to a point B diametrically opposite the distributor unit 19 and then gradually decreases to a portion of the wall A supporting the frame unit 18. In order to evenly apportion the forage material discharged into the silo over the entire area of the silo the chute 104 must be rotated at a variable rate of speed. Starting from point A the speed of the chute 104 gradually decreases so that an increasing amount of forage material is discharged onto the slinger 82. This decrease in speed continues until the chute faces the opposite side or point B as shown in FIGURE 1. Then the speed of the chute 104 gradually increases until it faces the adjacent side of the silo. At this time the chute 104 moves at a relatively rapid rate of speed, to decrease the amount of forage material deposited on the slinger plate 82 and directed toward the portion of the silo wall carrying the frame unit 18. This variable movement of the chute 104 is controlled by changing the position of the power transmitting rollers 137 and 138 with respect to the axes of rotation of the pulley 116 and the plate 127.

As shown in FIGURE 4, the roller 137 is positioned closely adajcent the axis of rotation of the pulley 116 and thus its speed of rotation is relatively slow as it travels on a relatively small circumferential path on the pulley face 117. In addition, the roller 138 is positioned adjacent the peripheral edge of the face 128 of the plate 127 so that the bead 141 follows a relatively large path on the face 128 with the result that the shaft 108 turns at a relatively slow rate of speed. To increase the speed of the shaft 108 the rollers 137 and 138 are moved closer to the shaft 108 so that the peripheral bead 139 on the roller 137 moves radially outward from the axis of rotation of the pulley 116 with the result that its speed of rotation is substantially increased. In the same manner the bead 141 of the roller 138 moves radially inwardly toward the axis of rotation of the plate 127 and thereby further increasing the speed of rotation of the shaft 108. In other words, the increased speed of rotation of the roller 137 is transmitted to the roller 138 which in turn produces an increase in speed of the plate 127.

Figure 11:
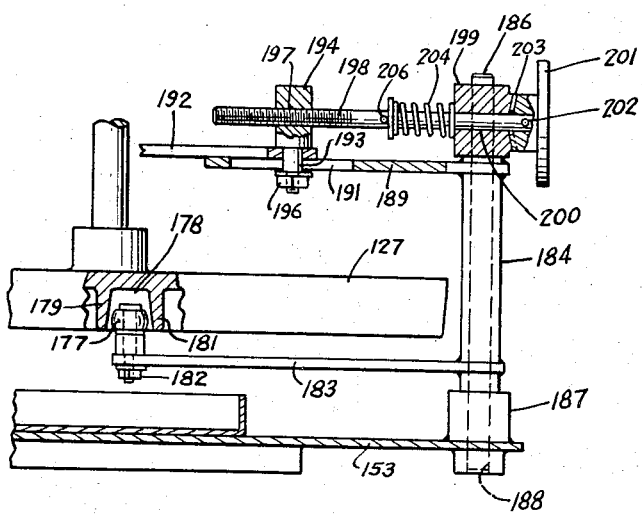
FIGURE 11 is a sectional view taken along the line 11—11 of FIGURE 8.
Figure 9:
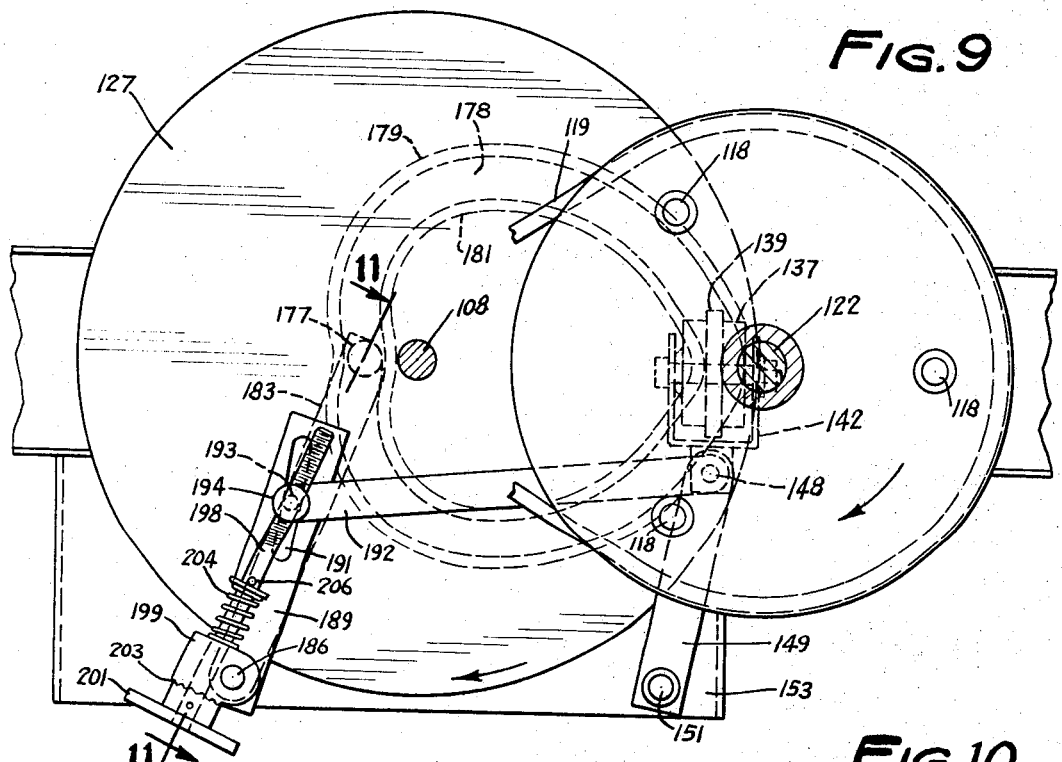
FIGURE 9 is an enlarged sectional view taken along the line 9—9 of FIGURE 4 showing the slow drive position of the power transmitting wheels.
Figure 10:
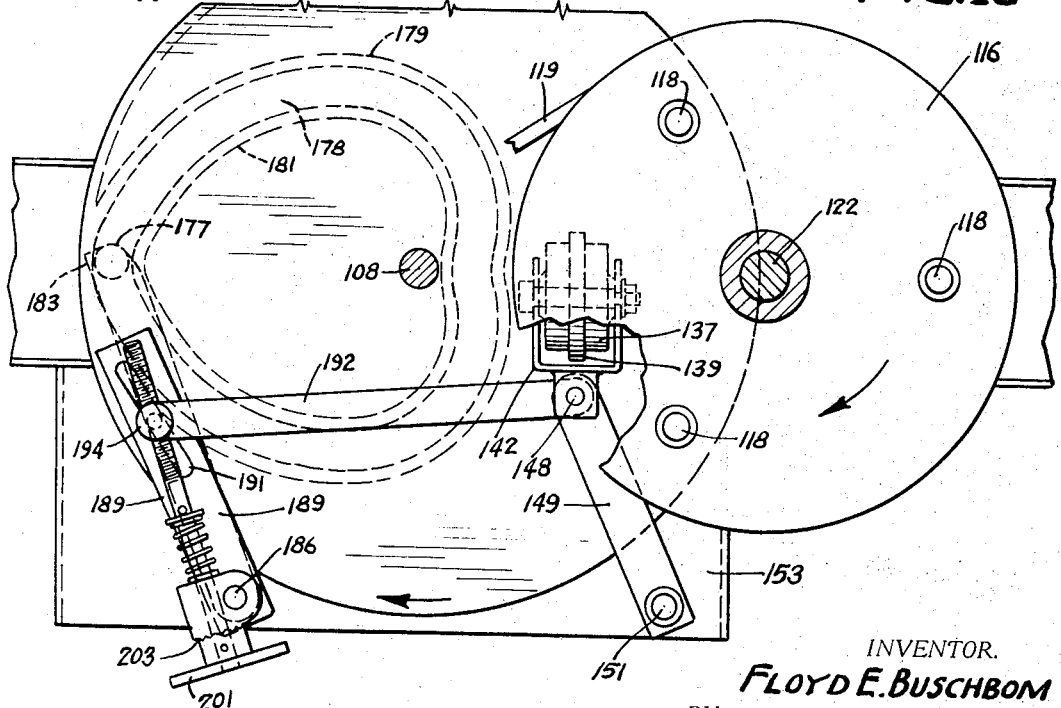
FIGURE 10 is a view similar to FIGURE 9 showing the fast drive position of the power transmitting wheels.

As shown in FIGURES 9 and 10, the position of the drive rollers 137 and 138 is determined by a cam controlled parallel linkage comprising a roller or cam follower 177 disposed in a groove 178 formed on the bottom side of the plate 127 by flanges 179 and 181. The groove 178 is a cam track and has a cardiod shape of a length greater than the diameter of the plate 127. The top broad section of the cardiod groove 178 is positioned adjacent the center of the plate 127 and the bottom point section of the groove 78 is located adjacent the periphery of the plate 127. As shown in FIGURE 11, the cam follower 177 is rotatably positioned in the groove 178 by a nut and bolt assembly 182 secured to a horizontal arm 183 positioned under the plate 127. The outer end of the arm 183 is secured to an upright sleeve 184 telescoped over an upright rod 186. The lower end of the rod 186 is mounted on a support 187 having a bore 188 for accommodating the rod 186. The support 187 is secured to the channel member 153. A top arm 189 is secured to the top section of the sleeve 184 and projects over the plate 127 substantially parallel to the arm 183. As shown in FIGURES 9 and 11, the arm 189 has a diagonally disposed elongated slot 191 in the outer end section thereof. A cross link 192 is pivotally connected at one end to the ears 147 by the upright pin 148. As shown in FIGURE 7, the link 192 is disposed between the ears 147 and lies in surface engagement on top of the link 149. The opposite end of the link 192, shown in FIGURE 11, is connected to the top arm 189 by a bolt 193 having an enlarged head 194. A nut 196 threaded on the lower end of the bolt 193 maintains the bolt in assembled relation with the cross link 192 and arm 189. The head 194 has a transverse threaded bore 197 into which is threaded a control rod 198. A support 199 pivotally mounted on the upper end of the rod 186 has a transverse bore 200 for receiving the control rod 198. A knob 201 is attached to the outer end of the rod 198 by a transverse pin 202. The abutting faces of the support 199 and the knob 201 have coacting teeth 203 used to maintain the adjusted rotated position of the rod. A spring 204 positioned about the rod abuts the support 199 on the side opposite the knob 201 and engages a pin 206 projected transversely through the control rod 198. The spring biases the coacting teeth 203 in locking engagement.

As shown in FIGURE 9, the control rod 198 is rotated by turning the knob 201 to change the position of the bolt 193 with respect to the slot 191. The result is that movement of the bolt 193 toward the upright support rod 186 decreases the effective length of the top arm 189 and thereby limit angular movement of the link 149 so as to minimize the variation in speed of rotation of the shaft 108. When the angular movement of the link 149 is limited the shaft 108 rotates at a relatively slow rate of speed because the rollers 137 and 138 have a minimum of movement from the axis of rotation of the pulley 116. The result is that the speed of the shaft 108 will increase and decrease at a relatively slow rate.

Adjustment of the control rod 198 in the opposite direction moves the bolt 193 outwardly toward the end of the top arm 189 thereby increasing the effective length of the arm 189 so as to provide maximum swinging movement of the link 149 and maximum radial movement of the rollers 137 and 138. The result is that there is a greater speed differential between the slow and fast speeds of rotation of the shaft 108.

In the mounting of the distributor assembly 15 on the top portion 28 of the silo 16 as shown in FIGURE 2, the clamp assembly 27 is initially elevated to the top of the silo and placed in an upright position adjacent the inside and outside walls of the top silo portion 28. With the horizontal plate 35 resting on the top edge of the silo the nut and bolt assemblies 34 are adjusted to rigidly attach the clamp assembly 27 to the top of the silo wall. In this position the arm 38 projects radially inwardly into the silo thereby spacing the first pulley 39 from the silo wall.

A flexible member such as a rope is trained over the pulleys 39 and 41 and is used to elevate the rails 29 and 31 up to the clamp assembly 27. The rails are attached to the clamp assembly 27 by inserting the arms 49 and 51 into the opposite ends of the transverse tubular member 48 so that the legs 53 and 54 project in a downward direction toward the silo wall as shown in FIGURE 3. The arms 49 and 51 are maintained in assembled relation with the tubular member 48 by adjusting the set screws 52. With the rails 29 and 31 pivotally assembled in the tubular member 48 they will pivot in a downward direction until the shoes 56 and 57 engage the inside silo wall. In this position the rails 29 and 31 of the frame unit 18 are rigid and project toward the center of the silo.

In mounting the distributor unit 19 on the rails 29 and 31 the rope is attached to the distributor unit positioned on the bottom of the empty silo and trained over the pulleys 39 and 41. The distributor unit 19 is then elevated by pulling on the outside end of the rope. In this manner the wheel assemblies 66 and 67 may be positioned on the rails 29 and 31 with the chute 104 in an upward direction. The blower pipe 22 and its curved discharged end 23 is then erected adjacent the outside wall of the silo and maintained in position on the clamp assembly 27 by the holding unit 42. In this position the curved discharge pipe section 23 projects into the silo over the distributor unit 19 as shown in FIGURE 2. In the event that the chute 104 is not in substantial vertical alignment with the discharge end 24 of the pipe section 23 the distributor unit 19 is adjusted by longitudinally moving the wheel assemblies 66 and 67 along the rails 29 and 31. The distributor unit 19 is retained in the selected adjusted position by the chains 105 which are attached to the upright U-shaped fingers 110 to limit the downward and inward movement of the distributor unit along the rails 20 and 31.

Figure 6:
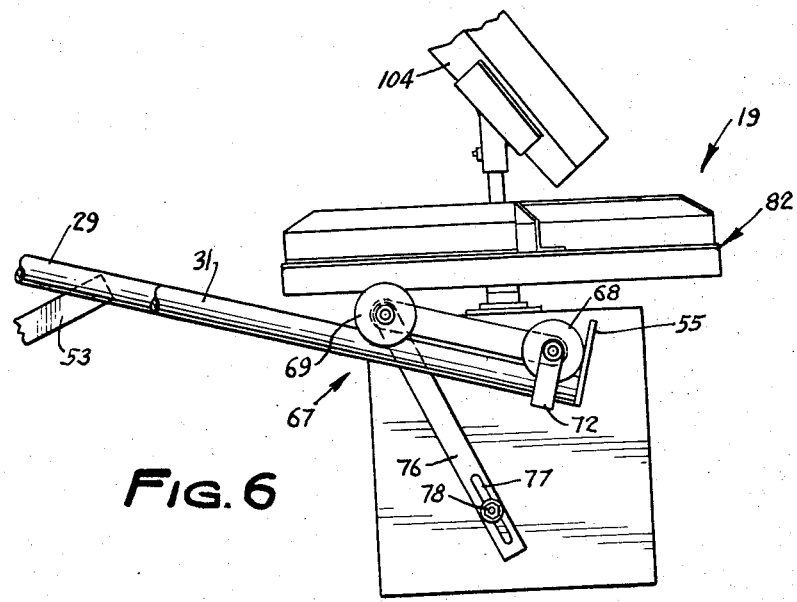
FIGURE 6 is a fragmentary side view of the distributor assembly of FIGURE 2 showing a tilted position of the distributor unit.

The angular position of the slinger 82 may be tilted with respect to the horizontal plane as shown in FIGURE 6 for large diameter silos to increase the throwing range of the slinger. In smaller diameter silos the slinger plate 82 is held in a substantially horizontal position as shown in FIGURE 2. This tilting adjustment of the slinger 82 is made by changing the positions of the nut and bolt assembly 77 with respect to the end of the struts 76 of each wheel assembly 66 and 67. This adjustment tilts the entire frame 58 about the axes 71 of the wheel assemblies 66 and 67.

In use, forage material 26 is discharged from the end section 23 of the blower pipe onto the angularly disposed chute 104. Upon energization of the motor 93 the slinger 82 as well as the chute 104 rotates about the upright axis of the chute 108. The chute 104 collects the forage material 26 and directs this material in a circular path onto the rotating slinger 82. The rotating slinger 82 receives the forage material and moves it in a circumferential and outward direction. Centrifugal force outwardly throws or spreads the material over the entire top area of the silo.

The motor 93 is in direct driving engagement through the belt 103 with the slinger 82 while the chute 104 is drivably coupled to the motor 93 by the variable drive mechanism 113 which includes the combined clutch and brake 114 controlling the rotation of the chute 104 independent of the rotation of the slinger 82. The brake permits the chute 104 to be fixed in a particular position so that it can direct forage material to a particular area of the silo rather than evenly spread the forage material over the entire area of the silo.

The combined clutch and brake 114 includes an operator arm 164 which controls the clutch releasing and brake applying cam 159. When the clutch is in the applied position the plate 127 is biased in an upward direction by the resilient member 157 acting on the lever 154 as shown in FIGURE 4. The resilient member 157 biases the adjacent end of the lever 154 upwardly compressing the release spring 158. The opposite end of the lever 154 pivots on the cam 159. The plate 127 being biased in an upward direction forces the flat plate face 128 into engagement with the roller 138 thereby effecting a drive between the pulley 116 and the plate 127. Since the plate 127 is drivably coupled to the upright shaft 108 by the ball 133 the chute 104 rotates with the plate.

To evenly apportion the forage material over the entire top surface of the silo the chute 104 is rotated at a variable rate of speed to compensate for the changing radial distances between the chute and the wall facing the discharge end of the chute 104. As this distance increases, the rotational speed of the chute 104 gradually decreases. Conversely as this distance decreases the rotational speed of the chute 104 increases. This variable movement of the chute is controlled by changing the position of the drive rollers 137 and 138 with respect to the pulley face 117 and the plate face 128.

As shown in FIGURES 9 and 10, the drive rollers 137 and 138 are moved radially of the axes of rotation of the pulley 116 and the plate 127, respectively. This movement is effected by a cam follower 177 positioned in a cardiod shaped cam groove 178 formed on the bottom side of the plate 127. An adjustable parallel linkage is used to connect the cam follower 177 to the power transmitting rollers 137 and 138 so that the position of the power transmitting is determined by the position of the cam follower 177 in the cardiod groove 178. This variable drive is timed with the position of the chute 104 in order to coordinate the speed of rotation of the chute 104 with respect to the change in distance between the chute and its adjacent facing silo wall.

Figure 12:
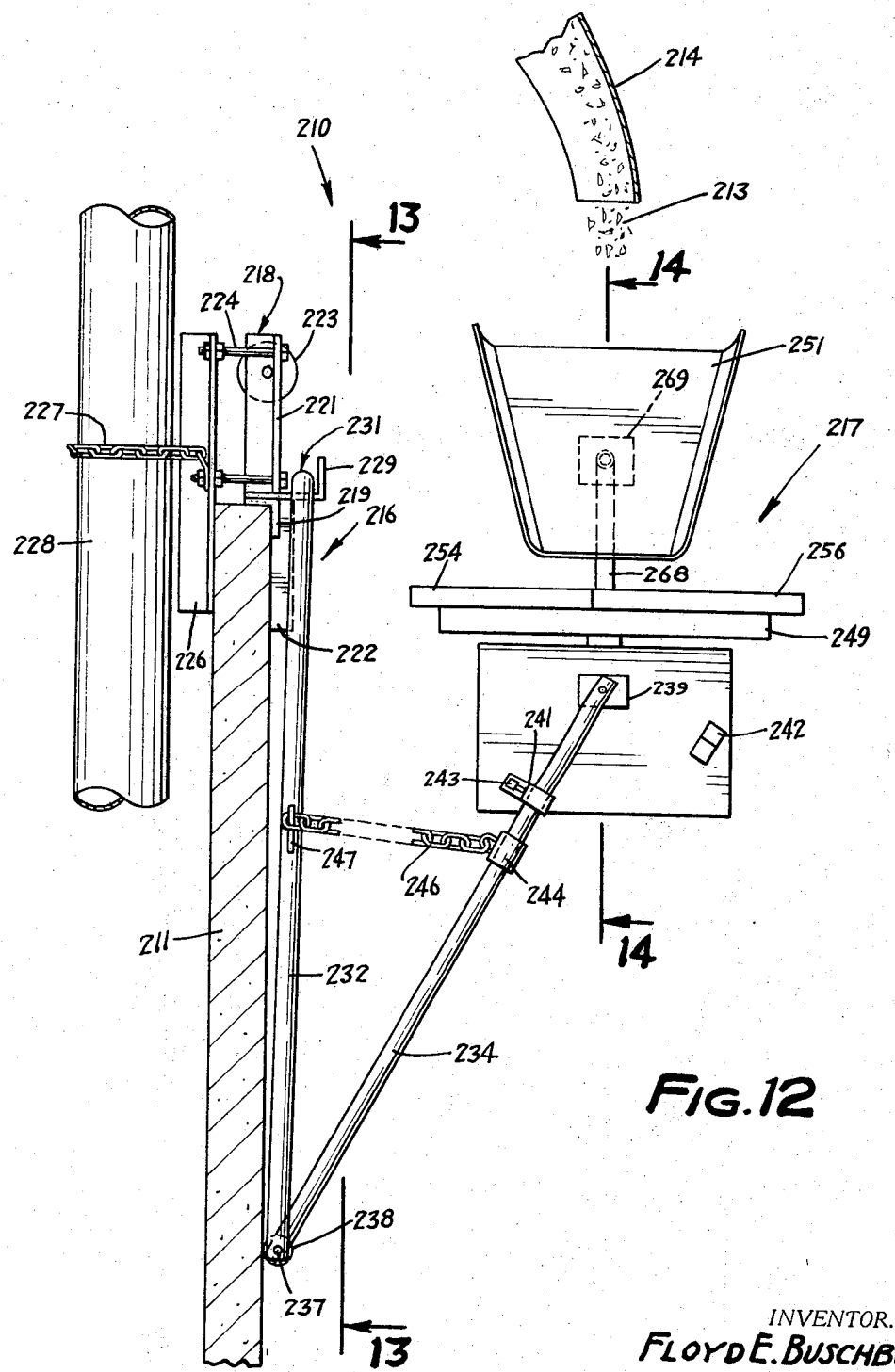
FIGURE 12 is a sectional view similar to FIGURE 2 of a modified ensilage distributor assembly.

Referring to FIGURE 12, there is shown a modified distributor assembly indicated generally at 210 mounted on a silo wall 211. The distributor assembly 210 projects inwardly into the storage area of the top portion of the silo and collects forage material 213 discharged from a horn 214 of an ensilage delivery machine, as a blower or the like. The collected material is fed at a variable rate onto a rotating member and is evenly distributed over the area of the silo.

A distributor assembly 210 is adjustably mounted on the silo wall 211 by a frame unit 216 carrying a distributor unit indicated generally at 217. The frame unit 216 has a clamp assembly indicated generally at 218 mounted on the top section of the silo wall 211. The clamp assembly 218 has a transverse angle member 219 positioned on the inner top edge of the silo wall 211. An upright member 221 is secured to the top of the angle member 219 and a downwardly projected leg 222 secured to the angle member 219 engages the inner surface of the silo wall 211. A pulley 223 rotatably mounted on the upper section of the member 221 is used to accommodate a flexible member used to elevate the distributor assembly to the top of the silo. The upright member 221 is attached with nut and bolt assemblies 224 to an upright outside member 226 having a lower portion in engagement with a portion of the outside silo wall. Nut and bolt assemblies 224 are adjustable to securely mount the clamp assembly 218 on the silo wall. A chain 227 secured to the upright member 226 extends about a tubular blower pipe 228 is used to attach the blower pipe to the clamp assembly.

Figure 13:
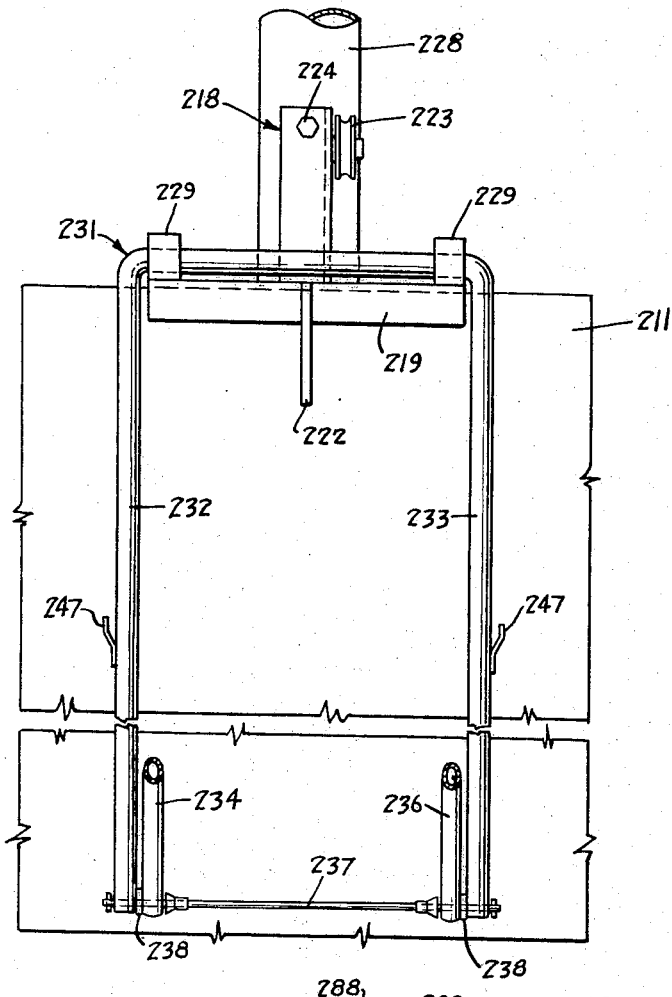
FIGURE 13 is a foreshortened sectional view taken along the line 13—13 of FIGURE 12.

As shown in FIGURE 13, a pair of transversely spaced hooks 229 having upright end sections are secured to the opposite ends of the angle member 219. Hooks 229 are used to support a folding frame comprising an inverted U-shaped member 231 having downwardly projected legs 232 and 233. A pair of upwardly and inwardly projected arms 234 and 236 are pivotally connected to the lower ends of the legs 232 and 233 by a transverse rod 237. Washers 238 positioned on rod 237 are interposed between the leg 232 and arm 234 and leg 233 and arm 236. The washers bear against the inner surface of the silo wall 211 and function as wheels when the frame is moved to the top of the silo.

Figure 14:
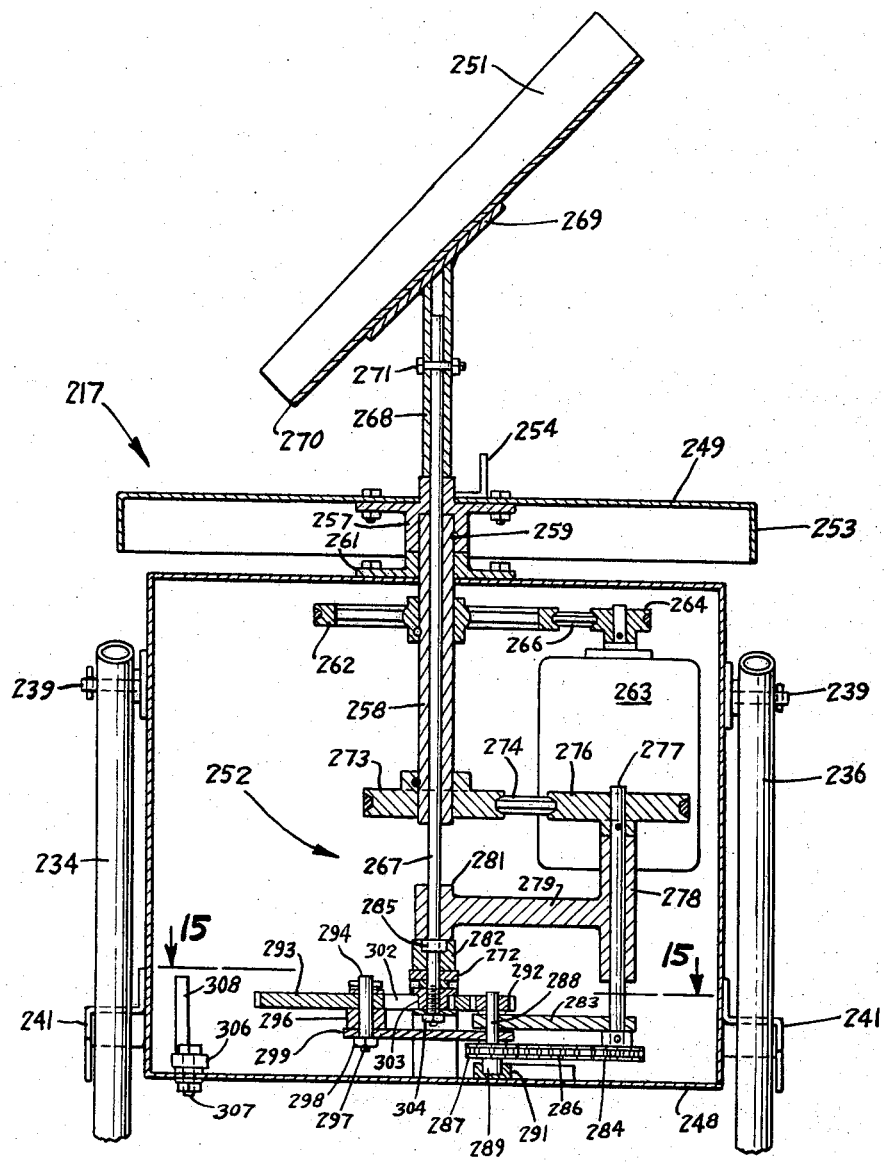
FIGURE 14 is an enlarged sectional view taken along the line 14—14 of FIGURE 12.

As shown in FIGURE 14, the upper ends of the arms 234 and 236 are mounted on pivot brackets 239 secured to opposite sides of the distributor unit 217. The horizontal position of the distributor unit 217 is maintained by a pair of stops or Z shaped members 241 secured to opposite housing side walls of the distributor unit. Referring to FIGURE 12 a pair of second stops 242 spaced from stops 241 are used to limit tilting of the distributor unit to a position where it can be inspected and if necessary adjusted and repaired. Adjusting screws 243 provided in stops 241 permit pivotal adjustment of the distributor unit above the axes of the pivot brackets 239.

The arms 234 and 236 are held in an upright position as shown in FIGURE 12 by collars 244 attached to chains 246. Chains 246 are connectable to offset spurs 247 secured to the legs 232 and 233. The position of the distributor unit 217 toward or away from the silo wall 211 may be changed by merely changing the length of the chains 246 with respect to the offset spurs 247.

As shown in FIGURE 14, distributor unit 217 has a box shaped housing 248 rotatably supporting a horizontal spreader or slinger disc 249 and a material receiving chute or inclined trough-like member 251. The spreader disc 249 is located in a generally horizontal plane above the top of the housing 248 with the chute inclined upwardly from the top of the disc 249. Within the housing 248 is a drive mechanism indicated generally at 252 for rotating the slinger disc 249 and the chute 251. The drive mechanism 252 functions to rotate the spreader disc 249 at a substantially constant rate of speed and to rotate the chute 251 at a slower rate of speed. The drive for the chute 251 has variable drive characteristics to increase and decrease the rate of angular movement of the chute 251 during each revolution of the chute 251.

The spreader disc 249 has a downwardly projected peripheral flange 253 terminating slightly above the plane of the top wall of the housing 248. Secured to the top of the disc 249 are a pair of oppositely directed upright vanes 254 and 256. As shown in FIGURE 12, vanes 254 and 256 extend substantially radially of the disc 249 and have outer end portions projected radially beyond the periphery of the disc.

Referring to FIGURE 14, the center section of disc 249 is secured to a hub 257 telescoped over the upper end of a tubular drive shaft 258. A pin 259 drivably couples the hub 257 with the shaft 258. A bearing 261 secured to the top wall of the housing 248 supports the tubular drive shaft 258 in an upright position and rotatably mounts the disc 249 on the housing 248. The tubular drive shaft 258 projects downwardly into the housing and is drivably attached to a large pulley 262. An electric motor 263 mounted on the back wall of the housing has a drive pulley 264 aligned with the pulley 262. Belt 266 trained over the pulleys 262 and 264 transmits power from the motor 263 to the tubular shaft 258 which in turn rotates the slinger disc 249 at a substantially constant rate of speed. Positioned concentrically and extended through the tubular drive shaft 258 is an upright shaft 267 transmitting power to the inclined chute 251. The upper end of the shaft 267 projects into a downwardly projected tubular member 268 secured to an inclined plate 269. A bolt 271 drivably couples the tubular member 268 with the upright shaft 267. The base of the chute 251 secured to the inclined plate 269 positions the discharged end 270 of the chute above and inwardly from the peripheral edge of the slinger disc 249.

The lower end of the shaft 267 projects through a transverse support plate 272 and is coupled to a motion transmitting structure described hereinafter which rotates the shaft 267 at continuously increasing and decreasing rates of speed during each revolution of the shaft so as to vary the rate of ensilage discharged from the inclined chute 251 onto the rotating spreader disc 249 along a circumferential path inwardly from the periphery of the spreader disc 249.

Secured to the lower end of the tubular shaft 258 is a pulley 273 driving a belt 274 trained about a pulley 276 secured to an upright shaft 277. The shaft 277 extends through an upright sleeve 278 secured to a horizontal arm 279. The arm is mounted on the shaft 267 by an inner sleeve 281 which rests on a boss 282 projected upwardly from the support plate 272. The axial position of the shaft 267 is maintained by a thrust bearing 285 located in the boss 282.

Figure 16:
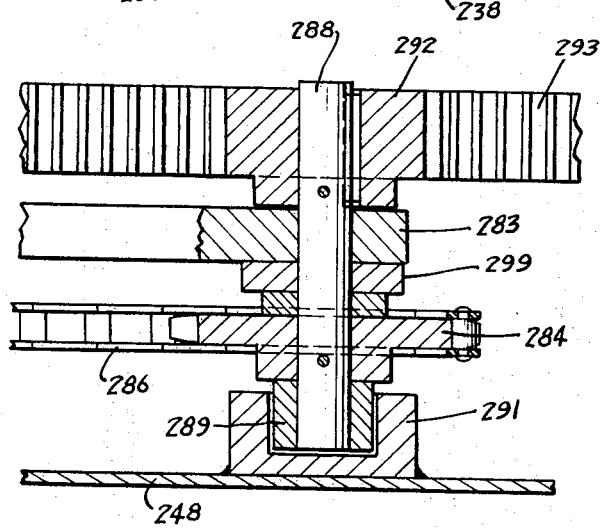
FIGURE 16 is an enlarged sectional view taken along the line 16—16 of FIGURE 16.

The lower end of the shaft 277 projects through a horizontal link 283 and carries a sprocket 284. A link chain 286 extends around sprocket 284 and over a sprocket 287 mounted on the lower section of an upright shaft 288. As shown in FIGURE 16, shaft 288 projects through sprocket 284 and into a cylindrical guide 289 positioned in a linear track 291 secured to the bottom wall of the housing 248. From the upper side of sprocket 284 shaft 288 projects through a bore in the link 283 and is secured to a small spur gear 292. The teeth of the spur gear 292 are in meshing engagement with corresponding teeth on a large spur gear 293 rotatably mounted on upright pin 294. The pin 294 projects upwardly from and is secured to a block 296 located below the gear 293. A threaded stud 297 projects downwardly from the block 296 and carries a nut 298. Stud 297 and the upright shaft 288 are connected by a flat link 299 operative to hold the gears 292 and 293 in meshing engagement.

Figure 15:
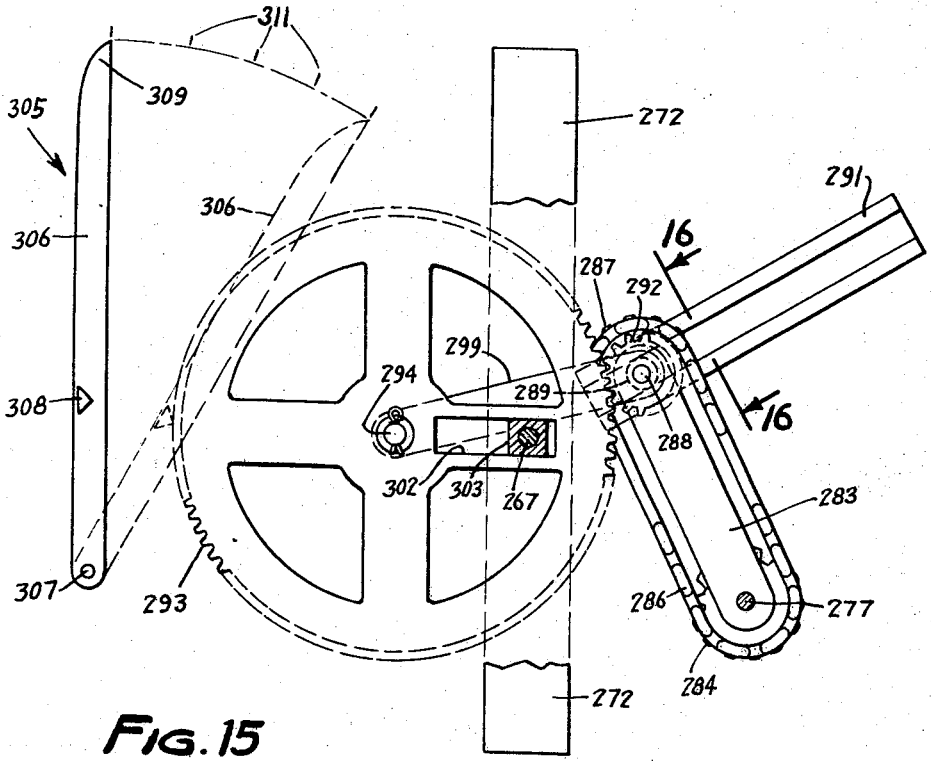
FIGURE 15 is an enlarged sectional view taken along the line 15—15 of FIGURE 14 showing the fast speed drive position for the chute drive shaft.

As shown in FIGURE 15, the large spur gear 293 has a rectangular shaped radial slot 302 which functions as a guideway for a rectangular block 303 threaded onto the lower end of the shaft 267. A nut 304 (FIG. 14) threaded on the end of the shaft 267 locks the block 303 with the shaft and secures the block to gear 293. The rectangular block 303 has a width substantially equal to the width of the rectangular slot so as to permit radial movement of the block relative to the gear 293 when nut 304 is loose. The radial position of the block 303 in slot 302 determines the amount of variation in the speed of rotation of the inclined chute 251. This speed variation is determined by the changing position of the axis of rotation of the gear 292 relative to the axis of the shaft 267. As gears 292 and 293 rotate shaft 288 sequentially moves toward and away from shaft 267 during each revolution of gear 293. The angular speed of shaft 267 increases as shaft 288 moves toward shaft 277 and decreases as shaft 288 moves away from shaft 277.

A gauge 305 is used to determine the adjusted positions of the gear 293 relative to the block 303. Gauge 305 includes a lever 306 pivoted to the housing by a bolt 307. Lever 306 has an upright gauge arm 308 which on movement of the lever 306 moves toward and away from the periphery of the gear 293. The free end of the lever has a point 309 coordinated with indicia 311 on the housing bottom wall which indicates different silo diameters. The adjustment is made by loosening the nut 304 and sliding the gear 293 relative to the block 303. When the lever indicates the desired silo diameter the nut 304 is secured thereby securing the block 303 with gear 293. Lever 306 is now moved away from the gear 293.

In mounting the distributor assembly 210 on the top portion of the silo 211 as shown in FIGURE 12, the clamp assembly 218 is initially elevated to the top of the silo and clamped about the inside and outside walls of the silo. The clamp assembly 218 can remain permanently attached to the silo as the inverted U-shaped member 231 rests on the hooks 229.

A flexible member, as a rope or cable, trained over pulley 223 is used to elevate the U-shaped member 231 along with the distributor unit 217 to the top of the silo. The distributor unit 217 is attached to the ends of the arms 234 and 236 before it is elevated to the top of the silo and chains 246 are attached to the offset spurs 247 to position the distributor unit 217 inwardly from the inside silo wall. During elevation of the distributor unit and the folding frame washers 238 function as small wheels which roll on the inside silo wall. The folding frame is attached to the clamp assembly 218 by placing the base portion of the inverted T-shaped member 231 over the hooks 229 as shown in FIGURE 13. In this position horn 214 directs the forage material 213 onto the mid-section of the inclined chute 251.

In operation, forage material 213 discharged from the horn 214 is guided by the inclined chute 251 and discharged onto the spreader disc 249. Chute 251 functions to collect the forage material flowing from horn 214 and direct the collected material in a circular path onto the top of the rotating disc 249. Disc 249 together with its outwardly directed vanes 254 and 256 move the forage material in a circumferential and outward direction throwing the material over the entire top area of the silo.

The slinger disc 249 is driven by the motor 263 which drives the tubular shaft 258. As shown in FIGURE 14, the upper end of the tubular shaft 258 is drivably coupled by pin 259 to the hub 257 carrying the slinger disc 249. Thus, the motor 263 rotates the slinger disc 249 at a substantially constant rate of speed.

Figure 17:
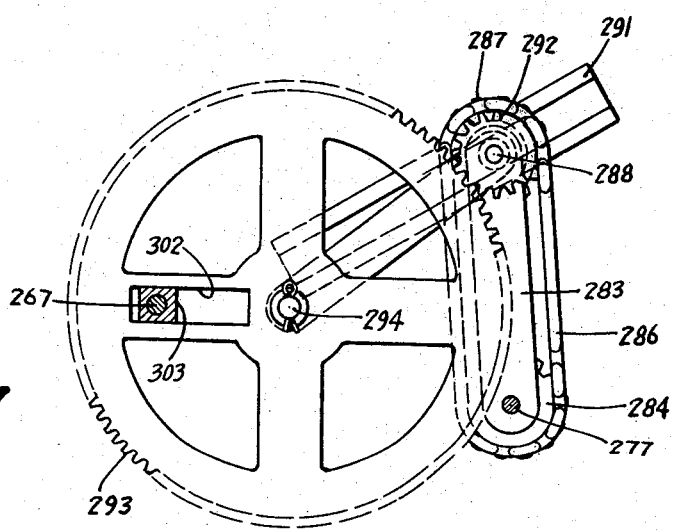
FIGURE 17 is a view similar to FIGURE 15 showing the slow speed drive position for the chute drive shaft.

To evenly apportion the forage material over the entire top surface of the silo the inclined chute 251 is rotated at a variable rate of speed to compensate for the changing radial distances between the discharge end 270 of the chute and the silo wall facing the discharge end of the chute 251. As this distance increases the rotational speed of the chute 251 gradually decreases. Conversely, as this distance decreases the rotational speed of the chute 251 increases. This variable movement is affected by the drive mechanism for the shaft 267. The power transmitted to the tubular shaft 258 by the motor 263 is directed to an upright shaft 277 by means of pulleys 273 and 276 and belt 274. As shown in FIGURES 15 to 17, shaft 277 is drivably coupled to a small spur gear 292 by a chain and sprocket drive. The small spur gear 292 rotates the large gear 293 drivably coupled to the shaft 267 by a block and slideway 303 and 302, respectively. Gear 293 is rotated about the axis of shaft 267. Since the block cannot rotate in the slot 302 a rotational force is transmitted to shaft 267. The speed of rotation of the shaft 267 varies during each revolution of the gear 293 as the distance between shaft 267 and shaft 288 carrying the gear 292 constantly changes. This distance increases during one-half revolution of the gear 293 and decreases during the other one-half revolution of the gear 293. The result is a change in the speed of rotation of the shaft 267. In other words, the shaft 267 accelerates during one-half revolution and decelerates during the other half of rotation.

As shown in FIGURE 15, rotational movement of the shaft is at a relative fast rate as the distance between the shaft 267 and the shaft 288 is at a minimum. As shown in FIGURE 17, gear 288 as well as gear 293 moves outwardly as guided by the track 291 away from the shaft 267 thereby the rotational speed of the shaft 267 is at a minimum. It is at this point that the discharge end of the inclined chute 251 is facing away from the portion of the silo wall adjacent the distributor unit as to direct a relatively large amount of forage material outwardly into the silo. In other words, the variable drive for the shaft 267 is timed with the position of the inclined chute 251 in order to coordinate the speed of rotation of the chute 251 with respect to the change in distance between the chute and its adjacent facing silo wall.

In terms of a method of distributing forage material in a tower silo the invention comprises the steps of transporting the forage material to the top of the silo with the use of a conveyor, such as a blower or silo filler, and discharging the silage material in a downward direction into the silo. This downwardly directed forage material is continuously collected by the inclined chute which discharges the forage material onto the top of the rotating slinger disc. The chute is rotated to discharge forage material in a circular path on the slinger disc to provide an even apportionment of forage material over the entire top area of the silo. The speed of rotation of the discharge chute is varied at a decreasing rate of speed during substantially one-half the circular path and at an increasing rate of speed during the remainder of the circular path so as to vary the discharge rate of forage material onto the slinger disc. It is in this manner that the silage material is evenly distributed over the entire top area of the silo as the variable speed of rotation of the chute compensates for the variable distance between the opposite silo wall and the distributor unit.

It is apparent that many modifications and variations of this invention as hereinbefore set forth may be made without departing from the spirit and scope of the invention. The specific embodiments described are given by way of example only and the invention is limited only by the terms of the appended claims.

What is claimed is:

1. An apparatus for distributing forage material discharged from a conveyor into a silo having an upright wall comprising rail means mounted on the silo wall and projected into the interior of the silo, frame means adjustably mounted on the rail means for movement relative to the silo wall, spreader means mounted on the frame means for rotation about an upright axis, means for tilting the spreader means about a substantially horizontal axis, chute means mounted on the frame means for rotation about said upright axis, said chute means positioned to receive forage material discharged by the conveyor and to direct said material onto the spreader means, and drive means for rotating said spreader means and said chute means whereby said forage material is deposited onto said spreader means in a circular path and directed outwardly by the rotating spreader means, said drive means having means for rotating the chute means at an increasing rate of speed during a part of the angle of rotation thereof and at a decreasing rate of speed during the remainder of said angle of rotation.

2. An apparatus for distributing forage material discharged from a conveyor unit into a silo having an upright wall comprising support means mounted on the silo wall and projected into the interior of the silo, frame means mounted on the support means, spreader means mounted on the frame means for rotation about an upright axis, deflector means mounted on the frame means for rotation about an upright axis, said deflector means positioned to receive forage material discharged by the conveyor unit and to direct said material onto the spreader means, and drive means for rotating said spreader means and said deflector means whereby said forage material is deposited onto said spreader means in a circular path and directed outwardly by the rotating spreader means, said drive means having means for rotating the deflector means at an increasing rate of speed during a part of the angle of rotation thereof and at a decreasing rate of speed during another part of said angle of rotation.

3. The apparatus defined in claim 2 wherein said drive means includes clutch means for controlling the rotation of the deflector means independently of the rotation of the spreader means.

4. A distributor unit for spreading forage material discharged into a silo comprising a frame, spreader means mounted on the frame for rotation about an upright axis, deflector means positioned above the spreader means and mounted on the frame for rotation about an upright axis and said deflector means positioned to receive forage material discharged into the silo and to direct said material onto the spreader means, drive means for rotating said spreader means whereby the forage material deposited on said spreader means is thrown outwardly in a substantially even pattern, said drive means having means for rotating the deflector means at an increasing rate of speed during a part of the angle of rotation thereof and at a decreasing rate of speed during another part of said angle of rotation.

5. In a distributor unit for spreading forage material, discharged into a silo, spreader means for scattering the forage material during the discharge thereof into the silo, deflector means positioned above the spreader means for collecting forage material discharged into the silo and directing said material onto the spreader means and drive means for rotating said deflector means at an increasing rate of speed during a part of each revolution thereof and at a decreasing rate of speed during another part of each revolution thereof whereby the amount of forage material directed in a direction onto the spreader means by the deflector means varies with the change in speed of rotation of the deflector means.

6. The distributor unit defined in claim 5 wherein said drive means includes clutch means for controlling the rotation of the deflector means.

7. In a forage distributor unit having a rotatable slinger and a rotatable chute for directing forage material onto the slinger a drive mechanism comprising drive means for rotating the slinger, a first member having a substantially flat surface, shaft means connecting the first member with the chute whereby on rotation of the first member the chute angularly moves relative to the slinger, a second member having a substantially flat surface spaced from and over the flat surface on the first member, power transmitting means connecting the drive means and the second member and a pair of engaging power transmitting roller means positioned between said first and second members, one of said roller means engaging the flat surface of the first member and the other of said roller means engaging the flat surface of the second member whereby upon rotation of the second member power is transmitted by the roller means to the first member.

8. In a forage distributor unit having a rotatable slinger and a rotatable chute for directing forage material onto the slinger; a drive mechanism comprising drive means for rotating the slinger, a first member having a substantially flat surface, shaft means connecting the first member with the chute whereby on rotation of the first member the chute angularly moves relative to the slinger, a second member having a substantially flat surface spaced from and over at least a part of the flat surface of the first member, power transmitting means connecting the drive means and the second member and power transmitting roller means positioned between said first and second members in engagement with the flat surfaces thereon whereby on rotation of the second member power is transmitted by the roller means to the first member, and control means for moving the power transmitting roller means toward and away from the axis of rotation of the first member thereby varying the speed of rotation of the first member without changing the speed of rotation of the second member.

9. A method of distributing forage material discharged downwardly into the top of a tower silo comprising the steps of diverting the downwardly directed forage material into a circuitous path so that varying quantities of forage material are placed along said path, said quantities of forage material increasing during substantially one-half the length of said path and decreasing during the remainder of the length of said path, and radially spreading the forage material during the discharge thereof in said path.

10. A method of distributing forage material in a tower silo comprising the steps of transporting forage material to the top of the silo, directing the forage material downwardly into the silo, continuously collecting the downwardly directed forage material, discharging the collected forage material in a circular path at a variable rate which increases during substantially one-half of the circular path and decreases during the remainder of the circular path, and radially spreading the forage material during the discharge thereof in the circular path.

11. A method of distributing forage material discharged into a tower silo with a distributor located in the silo adjacent a portion of the wall comprising the steps of continuously collecting the forage material discharged into the silo, discharging the collected material in a circular path in varying quantities along said path, said quantities of forage materials increasing during substantially one-half the length of said path starting from said portion of the wall and decreasing during the remainder of the length of said path, and radially spreading the forage material during discharge thereof in said path.

12. A distributor for a silo or the like having means for delivering silage, grain, or similar material, said distributor adapted to be mounted beneath the delivery means to distribute the material relative to the silo, said distributor comprising a base member adapted to be mounted beneath said material delivery means, a throwing element mounted relative to said base member for rotation about a generally vertical axis, a deflector element mounted above the throwing element for rotary motion about a generally vertical axis relative to the base, said deflector element having a deflector surface leading downwardly toward the upper surface of the throwing element, a plurality of vane elements rising from the upper surface of the throwing element, and power means adapted to rotate said throwing element at a velocity sufficient to propel the material outwardly therefrom and to rotate the deflector element at a slower rate, said power means including means for rotating the deflector element at a variable rate of speed during each revolution thereof, said deflector element adapted to intercept and direct a flow stream of material downwardly and outwardly to the surface of the throwing element to be accelerated and propelled outwardly by the vane elements beyond the periphery of the throwing element, the rotating deflector element causing the flow stream of material to be projected outwardly from the throwing element in a path which moves continuously in a circle about the throwing element.

13. A distributor for a silo or the like having means for delivering silage, grain, or similar material, said distributor adapted to be mounted beneath the delivery means to distribute the material relative to the silo, said distributor comprising a frame member adapted to be mounted beneath said material delivery means, a throwing element mounted relative to said frame member for rotation about a generally upright axis, a deflector element mounted above the throwing element for rotary motion about a generally upright axis relative to the frame member, said deflector element having a deflector surface leading downwardly toward the upper surface of the throwing element, and power means adapted to rotate said throwing element at a velocity sufficient to propel the material outwardly therefrom and to rotate the deflector element, said power means including means for rotating the deflector element at a variable rate of speed during each revolution thereof, said deflector element adapted to intercept and direct a flow stream of material downwardly and outwardly to the surface of the throwing element to be accelerated and propelled outwardly by the throwing element beyond the periphery of the throwing element, the rotating deflector element causing the flow stream of material to be projected outwardly from the throwing element in a path which moves continuously about the throwing element.

14. In a device for distributing particled material, a rotary distributor means mounted for rotation about an upright axis, said distributor means having an upper face, means for rotating said distributor means at a speed such that the material fed to said upper face will be projected in a peripheral direction from the rotary distributor means, feeding means mounted for rotation about an upright axis for delivering material to the upper face of the rotary distributor means at an eccentric point thereon, and drive means for rotating said feeding means to cause the point of material delivery to progress about such axis, said drive means including means for rotating the feeding means at a variable rate of speed during each revolution thereof.

15. In a device for distributing particled material, distributor means mounted for rotation about an upright axis, said distributor means having an upper face and a peripheral edge, means for rotating said distributor means at a speed such that material fed to said upper face will be projected outwardly therefrom, an inclined feed means disposed above said distributor means, said feed means having at the lower end thereof an elongated discharge edge, said feed means sloping upwardly and inwardly of the distributor means from said discharge edge so that material discharged near the middle of the discharge edge strikes the distributor means inwardly from the peripheral edge thereof while at least some of the material discharged near at least one end of the discharge edge is projected beyond the periphery of the distributor means, and drive means for rotating the feed means about the distributor means axis, said drive means including means for rotating the feed means at a variable rate of speed during each revolution thereof.

16. A distributor unit for spreading forage material discharged into a silo comprising: a frame, spreader means mounted on the frame for rotation about an upright axis, deflector means positioned above the spreader means and mounted on the frame for rotation about an upright axis, said deflector means positioned to receive forage material discharged into the silo and to direct said material onto the spreader means, drive means for rotating said spreader means and deflector means, said drive means including a shaft connected to the deflector means, a rotatable member having a radial slot, block means secured to the shaft and positioned in the slot so that rotation of the member rotates said shaft, guide means connected to the member for varying the distance between the axis of rotation of the member and the axis of rotation of the shaft during each revolution of the shaft and means to rotate said member driving said shaft at increasing and decreasing rates of speed during each revolution of the shaft.

17. An apparatus for distributing forage material discharged from a conveyor unit into a silo comprising a housing, spreader means mounted on the housing for rotation about an upright axis, deflector means mounted on the housing for rotation about an upright axis, said deflector means positioned to receive forage material discharged by the conveyor unit and to direct said material onto the spreader means, and drive means for rotating said spreader means and said deflector means said drive means including means for rotating the deflector means at increasing and decreasing rates of speed during each revolution of the deflector means whereby said forage material is deposited onto said spreader means in a circular path at a variable rate and directed outwardly by the rotating spreader means.

18. In a distributor unit for spreading forage material discharged into a silo, deflector means for collecting forage material discharged into the silo and directing said material outwardly and downwardly into the silo and drive means for rotating said deflector means at an increasing rate of speed during a part of each revolution thereof and at a decreasing rate of speed during another part of each revolution thereof whereby the amount of forage material directed in a direction outwardly around the silo varies with the change in speed of rotation of the deflector means.

19. In a forage distributor having a rotatable slinger and a rotatable chute positioned above the slinger for directing material a drive mechanism for rotating the slinger at a substantially constant rate of speed and for rotating the chute at a variable rate of speed during each revolution of the chute comprising drive means for rotating the slinger, a shaft connected to said chute, a rotatable member having a radial slot, means mounting the member about an axis substantially parallel to the axis of the shaft, block means secured to said shaft and positioned in said slot so that rotation of said member rotates said shaft, guide means connected to the means mounting the member for varying the distance between the axis of rotation of the member and the axis of rotation of the shaft during each revolution of the member thereby change the rotational speed of the shaft during each revolution of the shaft, and means connecting the member with the drive means to simultaneously rotate said member with the slinger whereby the chute rotates at a variable rate of speed with the slinger.

20. The forage distributor unit defined in claim 8 wherein the control means includes cam track means on said first member, cam follower means positioned in engagement with the cam track means and linkage means connecting the cam follower means with power transmitting roller means whereby the position of the roller means relative to the flat surfaces of the first and second members is controlled by the position of the cam follower means relative to the cam track means.

21. The forage distributor unit defined in claim 8 including lever means movable to a first position for holding said second member in drive engagement with said roller means, and cam means for moving said lever means to a second position disengaging the drive between the second member and the roller means.

22. The forage distributor unit of claim 21 including brake disc means secured to the first member for rotation therewith, and pin means attached to the lever means, said pin means engageable with said disc means when said lever means is in the second position thereby holding the first member against rotation.

23. The forage distributor unit defined in claim 21 including means for biasing said lever means to said first position.

24. The distributor unit defined in claim 5 wherein said drive means includes means for rotating the deflector means at speeds slower than the speed of rotation of the spreader means.

References Cited

UNITED STATES PATENTS

| 2,834,483 | 5/1958 | Friedman | 214—17 |
| 2,860,790 | 11/1958 | Erickson et al. | 214—17 |
| 3,077,274 | 2/1963 | Kitzrow. | |
| 3,184,081 | 5/1965 | Perdue et al. | 214—17 |
| 3,206,044 | 9/1965 | Schwichtenberg | 214—17 |
| 3,262,586 | 7/1966 | Smiley et al. | 214—17 |

FOREIGN PATENTS 142,985   1961   U.S.S.R.

ROBERT G. SHERIDAN, *Primary Examiner.*